Patented Mar. 22, 1927.

1,621,906

UNITED STATES PATENT OFFICE.

ROBERT SCHLESS, OF EMPORIUM, PENNSYLVANIA.

CLEANSING COMPOUND.

No Drawing.   Application filed August 10, 1925. Serial No. 49,459.

My invention relates to a cleansing compound and is based upon my discovery that what is known as vegetable ivory, ivory nut, or corozo nut in commerce, possesses cleansing properties, whether used alone, or in a mixture or compound.

Vegetable ivory, as known to commerce, is the seed or nut of a palm-like plant which grows in South America and whose fruit is in conglomerate heads, often weighing from twenty five to thirty pounds. Each head comprises thirty to fifty seeds or nuts. The seed contains a clear liquid which later condenses into a paste and then hardens into a white, horny substance which is called vegetable ivory. Chemically, the principal part of vegetable ivory is mannan, and it is non-poisonous, as has been determined by investigations conducted by the United States Department of Agriculture.

Vegetable ivory or ivory nut, or corozo nut is imported into United States and Europe in large quantities and is commonly used for the manufacture of buttons but in this process of button manufacture, a considerable portion of the vegetable ivory is wasted as sawdust or turnings which can be readily ground to a uniform fine powder.

I have discovered that vegetable ivory has cleansing properties and is well adapted for use, either alone, or in mixtures or compounds, as a domestic cleanser. I have found that it does not affect paint, calcimine, and other surface coatings or painted surfaces with which it may come in contact when used as a cleanser.

While I do not limit my discovery to the use of vegetable ivory, ivory nut, or corozo nut when in the form of a fine powder, nevertheless it is preferably ground up into fine powder before being used alone or with other ingredients when provided in the form of a mixture.

Similarly, while I do not limit my discovery to the utilization of the by-product of sawdust or turnings derived from the manufacture of commercial articles from vegetable ivory, yet when these are utilized, what has heretofore been waste, is rendered valuable and useful as a cleanser.

I have also mixed or compounded vegetable ivory with other ingredients or materials commonly used in cleansers and have found that the harsh, corrosive action of these other substances is rendered milder and more progressive by combining vegetable ivory therewith. Vegetable ivory, being mild, does not affect the skin as do harsher compounds.

Vegetable ivory may be combined with other substances to form liquid, pasty, or solid cleansers.

Without limitation to various cleansing compounds of which vegetable ivory may constitute an ingredient, the following examples will indicate some of the compounds or mixtures into which it may enter in the production of a cleanser.

Example No. 1—Ground vegetable ivory, calcium carbonate, and sodium carbonate.

Example No. 2—Ground vegetable ivory, calcium carbonate, sodium carbonate, and glycerine.

Example No. 3—Ground vegetable ivory, sodium carbonate, and glycerine solution in water.

My invention consists in vegetable ivory used alone, or in mixtures with other organic or inorganic materials, powdered, liquid, or solid for forming powdered, solid, or liquid cleansers and powdered, solid, liquid, or pasty soaps.

What I claim is:

1. A cleansing composition comprising vegetable ivory mixed with an alkaline carbonate.

2. A cleansing compound comprising vegetable ivory, calcium carbonate and sodium carbonate.

3. A cleansing compound comprising vegetable ivory, calcium carbonate, sodium carbonate, and glycerine.

4. A cleansing compound comprising vegetable ivory, sodium carbonate and glycerine solution in water.

In testimony whereof I affix my signature.

ROBERT SCHLESS.